US009721733B1

(12) United States Patent
Hirose et al.

(10) Patent No.: US 9,721,733 B1
(45) Date of Patent: Aug. 1, 2017

(54) METHOD FOR FORMING A DYE-SENSITIZED SOLAR CELL HAVING A POROUS FILM OF AN INORGANIC SUBSTANCE ON A BASE MATERIAL BY SPRAYING DRY FINE PARTICLES OF AN INORGANIC SUBSTANCE ON THE BASE MATERIAL

(75) Inventors: Shingo Hirose, Tsukuba (JP); Yukitoshi Ezuka, Tsukuba (JP); Jun Akedo, Tsukuba (JP); Shunsuke Kunugi, Tsukuba (JP); Satoshi Yoguchi, Tsukuba (JP); Setsuo Nakajima, Tsukuba (JP)

(73) Assignees: NATIONAL INSTITUTE OF ADVANCED INDUSTRIAL SCIENCE AND TECHNOLOGY, Tokyo (JP); SEKISUI CHEMICAL CO., LTD., Osaka (JP)

( * ) Notice: Subject to any disclaimer, the term of this patent is extended or adjusted under 35 U.S.C. 154(b) by 130 days.

(21) Appl. No.: 14/117,999

(22) PCT Filed: May 21, 2012

(86) PCT No.: PCT/JP2012/062936
§ 371 (c)(1),
(2), (4) Date: Mar. 21, 2014

(87) PCT Pub. No.: WO2012/161161
PCT Pub. Date: Nov. 29, 2012

(30) Foreign Application Priority Data

May 20, 2011 (JP) ................................. 2011-113623

(51) Int. Cl.
*H01L 21/00* (2006.01)
*H01G 9/20* (2006.01)

(52) U.S. Cl.
CPC ................................. *H01G 9/2031* (2013.01)

(58) Field of Classification Search
CPC ........................... H01G 9/2022; H01G 9/2031
See application file for complete search history.

(56) References Cited

U.S. PATENT DOCUMENTS

| 6,531,187 B2 | 3/2003 | Akedo |
| 2009/0114277 A1* | 5/2009 | Arakawa et al. ............. 136/256 |
| 2011/0315212 A1 | 12/2011 | Hayase et al. |

FOREIGN PATENT DOCUMENTS

| CN | 101071829 | 11/2007 |
| EP | 1231294 | 8/2002 |

(Continued)

OTHER PUBLICATIONS

"Modulation, material development, and evaluation technique of dye-sensitized solar cell", Gijyutukyouiku, pp. 89-93; along with a partial English translation thereof.

(Continued)

*Primary Examiner* — Stephen W Smoot
*Assistant Examiner* — Vicki B Booker
(74) *Attorney, Agent, or Firm* — Greenblum & Bernstein, P.L.C.

(57) ABSTRACT

The present invention is a method for forming a porous film of an inorganic substance on a base material by spraying fine particles of an inorganic substance on the base material such that the fine particles are bonded to the base material and bonded to one another, in which the fine particles include at least two kinds of fine particles which are small-size particles and large-size particles having different average particle sizes. According to the present invention, it is possible to provide a film forming method for forming a porous film formed of an inorganic substance without requiring a baking step, a body having a film formed thereon that is produced (Continued)

by the film forming method, and a dye-sensitized solar cell including the body having a film formed thereon.

15 Claims, 4 Drawing Sheets

(56) References Cited

FOREIGN PATENT DOCUMENTS

| | | | | |
|---|---|---|---|---|
| GB | WO 2008/032016 | * | 3/2008 | ............ 136/256 |
| JP | 2001-003180 | | 1/2001 | |
| JP | 2001-357899 | | 12/2001 | |
| JP | 3265481 | | 3/2002 | |
| JP | 2002-184477 | | 6/2002 | |
| JP | 3435459 | | 8/2003 | |
| WO | 01/27348 | | 4/2001 | |
| WO | 2007/100095 | | 9/2007 | |
| WO | 2008/032016 | | 3/2008 | |
| WO | 2010/109785 | | 9/2010 | |

OTHER PUBLICATIONS

Chemistry Letters, vol. 36, No. 6 (2007).
International Search Report for PCT/JP2012/062936, dated Aug. 21, 2012; along with an English translation thereof.
Notice of Allowance for Korean Application No. 10-2013-7032836, dated Apr. 29, 2014; along with an English translation thereof.
Extended European Search Report from Application No. 12790324.3, which was mailed on Jan. 23, 2015.
Chinese Office Action issued with respect to Application No. 201280035294.0, dated Nov. 10, 2016 (with partial translation).
Zhang Xiukun et al., "Preparation and properties of nano-crystalline TiO2 porous film electrode composed of large and small nano-particles", Functional Materials, vol. 40, No. 4, pp. 539-542, 2009.
Office Action issued in China Patent Appl. No. 201280035294.0, dated Dec. 25, 2015, along with an English translation thereof.

* cited by examiner

METHOD FOR FORMING A DYE-SENSITIZED SOLAR CELL HAVING A POROUS FILM OF AN INORGANIC SUBSTANCE ON A BASE MATERIAL BY SPRAYING DRY FINE PARTICLES OF AN INORGANIC SUBSTANCE ON THE BASE MATERIAL

TECHNICAL FIELD

The present invention relates to a film forming method for forming a porous film formed of an inorganic substance on a base material, a body having a film formed thereon that is obtained by the film forming method, and a dye-sensitized solar cell including the body having a film formed thereon. Priority is claimed on Japanese Patent Application No. 2011-113623, filed May 20, 2011, the content of which is incorporated herein by reference.

BACKGROUND ART

For a photoelectrode of a Dye-Sensitized Solar Cell (DSSC), a porous film onto which a photosensitive dye such as a ruthenium metal complex has been adsorbed and which is formed of an oxide semiconductor such as titanium oxide is used (PTL 1). In the conventional method for forming the porous film, slurry or paste containing particles of an oxide semiconductor is coated onto a base material, and the resultant is baked at a temperature less than or equal to a melting point of the oxide semiconductor, whereby a film in which the particles of the oxide semiconductor come into contact with one another with a weak force is formed. Generally, before coating, a binder such as ethyl cellulose is mixed in the slurry or paste so as to adjust the viscosity of the slurry or paste, improve porosity of a film to be formed, and form a porous film having an increased adsorption area of the photosensitive dye.

There is a known method that treats the surface of fine particles constituting the porous film to improve a photoelectric conversion efficiency (also called a generating efficiency) of a dye-sensitized solar cell. As a typical example thereof, a method, in which the porous film formed of titanium oxide that is formed as described above is dipped into an aqueous titanium tetrachloride solution, pulled up from the solution, and subjected to heating treatment to form a new titanium oxide film on the porous film, is known (NPL 1). The titanium oxide film is considered to play a role of forming a clean surface of the porous film and enhancing the adhesive force between the titanium oxide particles constituting the porous film.

CITATION LIST

Patent Literature

[PTL 1] Japanese Patent No. 3435459

Non-Patent Literature

[NPL 1] "Modulation, material development, and evaluation technique of dye-sensitized solar cell", Gijyutukyouiku, p 89~93

SUMMARY OF INVENTION

Technical Problem

The conventional base material supporting the porous film needs to be a material that endures baking, so it is difficult to use plastic, a resin film, or the like as the base material. Moreover, there is a problem that the time taking for the entire production process of the porous film is prolonged due to the time required for the baking step.

When plastic, a resin film, or the like is used as a base material, baking needs to be performed at a temperature of about 120° C. so as to form a porous film while preventing thermal denaturation of the base material. However, in the porous film formed by this method, the adhesive force between particles of the oxide semiconductor becomes weak due to the low baking temperature, and this leads to a problem that electron conductivity stays at a low level. Furthermore, when a binder is mixed in the slurry or paste containing the particles, the binder is not completely removed due to the low baking temperature, and this leads to a problem that electron conduction in the formed porous film is hindered.

The present invention has been made in consideration of the above circumstances and aims to provide a film forming method for forming a porous film formed of an inorganic substance without requiring a baking step, a body having a film formed thereon that is produced by the film forming method, and a dye-sensitized solar cell including the body having a film formed thereon.

Solution to Problem

The present invention has the following embodiments.

A first embodiment of the present invention is a method for forming a porous film of an inorganic substance on a base material by spraying fine particles of an inorganic substance on the base material such that the fine particles are bonded to the base material and bonded to one another, in which the fine particles include at least two kinds of fine particles which are small-size particles and large-size particles having different average particle sizes.

A second embodiment of the present invention is the film forming method according to the first embodiment, in which a ratio between the small-size particles and the large-size particles (small-size particles/large-size particles) in the porous film becomes higher than a ratio between the small-size particles and the large-size particles (small-size particles/large-size particles) in the fine particles to be sprayed on the base material.

A third embodiment of the present invention is the film forming method according to the first or second embodiment, in which an average particle size r of the small-size particles satisfies 1 nm≤r<200 nm, and an average particle size R of the large-size particle satisfies 0.2 μm≤R≤200 μm.

A fourth embodiment of the present invention is the film forming method according to the first or second embodiment, in which the average particle size r of the small-size particle satisfies 1 nm≤r<200 nm, and the average particle size R of the large-size particles satisfies 1 μm≤R≤200 μm.

A fifth embodiment of the present invention is the film forming method according to the first or second embodiment, in which the average particle size r of the small-size particles satisfies 1 nm≤r<200 nm, and the average particle size R of the large-size particles satisfies 1 μm≤R≤100 μm.

A sixth embodiment of the present invention is the film forming method according to the first or second embodiment, in which the average particle size r of the small-size particles satisfies 1 nm≤r<200 nm, and the average particle size R of the large-size particles satisfies 1 μm≤R≤50 μm.

A seventh embodiment of the present invention is the film forming method according to the first or second embodiment, in which the average particle size r of the small-size particles satisfies 1 nm≤r≤100 nm, and the average particle size R of the large-size particles satisfies 0.2 μm≤R≤200 μm.

An eighth embodiment of the present invention is the film forming method according to the first or second embodiment, in which the average particle size r of the small-size particles satisfies 1 nm≤r≤100 nm, and the average particle size R of the large-size particles satisfies 1 μm≤R≤200 μm.

A ninth embodiment of the present invention is the film forming method according to the first or second embodiment, in which the average particle size r of the small-size particles satisfies 1 nm≤r≤100 nm, and the average particle size R of the large-size particles satisfies 1 μm≤R≤100 μm.

A tenth embodiment of the present invention is the film forming method according to the first or second embodiment, in which the average particle size r of the small-size particles satisfies 1 nm≤r≤100 nm, and the average particle size R of the large-size particles satisfies 1 μm≤R≤50 μm.

An eleventh embodiment of the present invention is the film forming method according to the first or second embodiment, in which the average particle size r of the small-size particles satisfies 1 nm≤r≤100 nm, and the average particle size R of the large-size particles satisfies 1 μm≤R≤10 μm.

A twelfth embodiment of the present invention is the film forming method according to any one of the first to eleventh embodiments, in which a relative ratio (r/R) between the average particle size r of the small-size particles and the average particle size R of the large-size particles satisfies the relationship of (1/1,000)≤(r/R)≤(1/5).

A thirteenth embodiment of the present invention is the film forming method according to any one of the first to twelfth embodiments, in which a mixing ratio of the small-size particles to the large-size particles in the fine particles to be sprayed on the base material is 0.1:99.9 to 99.9:0.1 (parts by weight).

A fourteenth embodiment of the present invention is the film forming method according to any one of the first to thirteenth embodiments, in which treatment (operation) for spraying the fine particles of the inorganic substance on the base material is performed by spraying mixed particles consisting of the small-size particles and the large-size particles on the base material, and the large-size particles are caused to collide with the small-size particles having been sprayed on the base material such that the small-size particles are bonded to one another to form a film.

A fifteenth embodiment of the present invention is the film forming method according to any one of the first to fourteenth embodiments, in which the inorganic substance is an oxide semiconductor.

A sixteenth embodiment of the present invention is the film forming method according to any one of the first to fifteenth embodiments, in which the spraying is performed at room temperature.

A seventeenth embodiment of the present invention is the film forming method according to any one of the first to sixteenth embodiments, in which the base material is formed of a resin.

An eighteenth embodiment of the present invention is the film forming method according to any one of the first to seventeenth embodiments, in which the base material is a film formed of a resin.

A nineteenth embodiment of the present invention is the film forming method according to the seventeenth or eighteenth embodiment, in which a glass transition temperature (Tg) of the base material formed of a resin is lower than 200° C.

A twentieth embodiment of the present invention is the film forming method according to any one of the first to nineteenth embodiments, in which the porous film is a porous film for a photoelectrode of a dye-sensitized solar cell.

A twenty-first embodiment of the present invention is a body having a film formed thereon that is obtained by the film forming method according to any one of the first to twentieth embodiments.

A twenty-second embodiment of the present invention is the body having a film formed thereon according to the twenty-first embodiment, in which a content of the large-size particles in the porous film is 30% by volume or less.

A twenty-third embodiment of the present invention is the body having a film formed thereon according to the twenty-first or twenty-second embodiment, in which a porosity of the porous film is 50% to 80%.

A twenty-fourth embodiment of the present invention is a photoelectrode including the body having a film formed thereon according to any one of the twenty-first to twenty-third embodiments.

A twenty-fifth embodiment of the present invention is a dye-sensitized solar cell including the body having a film formed thereon according to any one of the twenty-first to twenty-third embodiments.

Advantageous Effects of Invention

According to the present invention, a baking step that has been conventionally performed is not necessary. Consequently, plastic, a resin film, or the like having a relatively low degree of heat resistance can be used as materials of the base material. As a result, a porous film can be formed on the base material such as plastic or a resin film having a relatively low degree of heat resistance. Moreover, since the baking step is not required for producing the film, the time taken for forming the film can be shortened, whereby production properties become excellent.

Furthermore, in the present invention, mixed particles consisting of small-size particles and large-size particles are sprayed on the base material. In this manner, the large-size particles collide with the top of the small-size particles having cumulated on the surface of the base material, whereby it is possible to reliably bond the small-size particles to the surface of the base material or to other adjacent small-size particles. That is, the small-size particles can be deposited onto the base material first, and then the large-size particles can strike the top of the small-size particles. Consequently, a large amount of energy (mechanical impact) is applied to the small-size particles, whereby the small-size particles can be more sufficiently bonded to one another.

As a result, a porous film can be more easily formed compared to the conventional case. That is, even when spraying of fine particles is performed at a lower speed compared to the conventional case, a porous film can be reliably formed.

According to the present invention, particles of an inorganic material are reliably bonded to one another to form a porous film. Therefore, unlike the so-called powder compact, the film has a high strength and excellent electron conductivity. Due to the bonding described above, pores functioning as dye adsorption sites are formed inside the porous film, and accordingly, adsorptivity of a dye becomes excellent. Since the pores are suitable for diffusion of an electrolytic solution, diffusivity of the electrolytic solution becomes excellent.

The body having a film formed thereon of the present invention has a structure in which the porous film having excellent properties is disposed on the surface thereof. Accordingly, the body is useful as a part constituting a photoelectrode.

The dye-sensitized solar cell of the present invention includes the body having a film formed thereon, and accordingly, the photoelectric conversion efficiency thereof is excellent.

Further, if the body having a film formed thereon that uses a flexible base material such as a resin film is used, a deformable dye-sensitized solar cell can be obtained.

DESCRIPTION OF EMBODIMENTS

Hereinafter, the present invention will be described in detail.

<<Film Forming Method>>

The film forming method of the present invention is a method for forming a porous film of an inorganic substance on a base material by spraying fine particles of an inorganic substance on the base material such that the fine particles are bonded to the base material and are bonded to one another.

Examples of the inorganic substance include particles of metals such as Pt, Ag, and Au, particles of semiconductors such as Si, CdS, CdSe, CdTe, PbS, PbSe, ZnO, $TiO_2$, $In_2O_3$, $SnO_2$, and $BaTiO_3$, known complex inorganic particles, and the like.

As the inorganic substance, oxide semiconductors that exhibit excellent electron conductivity and excellently carry a dye are preferable. Examples of such oxide semiconductors include titanium oxide ($TiO_2$), zinc oxide ($ZnO_2$), strontium titanate ($SrTiO_3$), and the like. Among these, titanium oxide that exhibits excellent electron conductivity when being formed into a porous film is preferable.

Generally, industrially used titanium oxide is roughly classified into anatase-type titanium oxide and rutile-type titanium oxide. In addition, Brookite-type titanium oxide and amorphous titanium oxide are also known.

When titanium oxide is used as the inorganic substance, any of the above titanium oxides may be used.

A porous film formed of mixed particles easily becomes a film having a strength suitable for a photoelectrode of a dye-sensitized solar cell.

As the small-size particles, rutile-type titanium oxide, Brookite-type titanium oxide, or amorphous titanium oxide may be used, in addition to anatase-type titanium oxide. Moreover, as the large-size particles, anatase-type titanium oxide, Brookite-type titanium oxide, or amorphous titanium oxide may be used, in addition to rutile-type titanium oxide.

The fine particles described above are mixed particles consisting of small-size particles having an average particle size r of smaller than 0.2 μm and large-size particles having an average particle size R of greater than or equal to 0.2 μm.

A relative ratio (r/R) between the average particle size r of the small-size particles and the average particle size R of the large-size particles satisfies the relationship of $(1/1,000) \leq (r/R) \leq (1/5)$.

The average particle size r of the small-size particles preferably satisfies $1\ nm \leq r < 200\ nm$ and more preferably satisfies $1\ nm \leq r \leq 100\ nm$.

If r is greater than or equal to the lower limit of the above range, the particles can carry a larger amount of a dye (sensitizing dye), and pores through which an electrolytic solution easily diffuse are easily formed in the porous film.

The upper limit of the above range is preferably less than 200 nm and more preferably 100 nm or less. If the upper limit is set as above, a state where the small-size particles are bonded to one another can be easily created.

As a result, the electron conductivity and strength of the porous film can be further improved.

The average particle size R of the large-size particles satisfies $200\ nm \leq R \leq 200\ \mu m$, preferably satisfies $200\ nm \leq R \leq 100\ \mu m$, more preferably satisfies $1\ \mu m \leq R \leq 100\ \mu m$, even more preferably satisfies $1\ \mu m \leq R \leq 50\ \mu m$, still more preferably satisfies $1\ \mu m \leq R \leq 10\ \mu m$, and particularly preferably satisfies $1\ \mu m \leq R \leq 5\ \mu m$.

If R is greater than or equal to the lower limit of the above range, it is possible to further increase the energy at the time of the collision between the large-size particles and the small-size particles, when the mixed particles are sprayed on the base material.

As a result, when a film is formed by the spraying described above, the small-size particles can be more reliably bonded to one another, the small-size particles can be more reliably bonded to the base material, or the small-size particles can be more reliably bonded to the large-size particles. Consequently, the electron conductivity and strength of the porous film can be further improved.

If R is less than or equal to the upper limit of the above range, it is possible to prevent the porous film having been formed on the base material from being scrapped off by the large-size particles during formation of the film. As a result, formation of the film proceeds well by the spraying described above, and accordingly, the film formation speed can be increased, and a state where the small-size particles are bonded to one another can be easily created.

The average particle size r of the small-size particles is determined as an average of particle sizes that are measured by means of observing multiple small-size particles with an electron microscope. In this case, the more the small-size particles to be measured, the better. However, for example, 10 to 50 particles may be measured, and the average thereof may be determined. Alternatively, for example, a method can be used in which a peak value of the particle size (volume average size) distribution, which is obtained by measurement performed using a laser diffraction-type particle size distribution analyzer, is determined as the average particle size r.

The average particle size R of the large-size particles may be obtained by the same measurement method as the method used for the average particle size r of small-size particles.

The measurement method used in the present invention to measure the average particle size of fine particles is not limited to the above two methods (an electron microscope or a laser diffraction-type particle size distribution analyzer), and measurement methods different from those methods may be used. Even when the particle size measured by a method other than the above two methods is outside the above range, if the particle size is confirmed to fall within the above range of the particle size by being measured by the above two methods, the fine particles are included in the fine particles of the inorganic substance used in the present invention.

For determining the average particle size r of the small-size particles constituting the mixed particles, it is preferable to measure r before the small-size particles are mixed with the large-size particles since r is easily measured by doing this. To plot a particle size distribution curve, which is obtained by the particle size distribution analyzer, of the small-diameter particles, it is preferable to conduct fitting on the premise that the number of peak within a range of an average particle size of less than 1 µm is one.

On the other hand, when it is mathematically or logically reasonable to conduct fitting on the premise that there are multiple peaks (for example, two to five peaks), the particle size distribution curve may be plotted by fitting that is conducted on the premise that there will be multiple peaks. In this case, according to the number of peak, there are first small-size particles, second small-size particles, third small-size particles, and so forth having multiple average particle sizes r1, r2, r3, and so forth. These small-size particles are collectively called a small-size particle group. The average particle size, which is obtained by weighting the average particle size of the respective small-size particles that belong to the small-size particle group according to the proportion of the respective small-size particles present and determining the average, corresponds to the "average particle size r of the small-size particles" of the present invention.

A half width (full half width) of the peak in the particle size distribution curve of the small-size particles is preferably equal to or greater than 1 nm and less than 200 nm, more preferably from 1 nm to 100 nm, and even more preferably from 1 nm to 50 nm. It is preferable to use small-size particles having a peak with a narrow half width, since this makes it easy to estimate the speed at the time of spraying and the collision energy relating to the speed and to control the spraying conditions.

It is preferable that the half width of the peak in the particle size distribution curve of the small-size particles be determined based on a distribution curve plotted by conducting fitting on the premise that the number of the peak within a range of an average particle size of less than 1 µm is one. On the other hand, when it is mathematically and logically reasonable to conduct fitting on the premise that there multiple peaks (for example, two to five peaks), the half width of each peak may be determined on the assumption that the number of the peak is plural. Even in this case, it is preferable for the half width of each peak to fall within the above range.

For determining the average particle size R of the large-size particles constituting the mixed particles, it is preferable to measure R before the large-size particles are mixed with the small-size particles since R is easily measured in this manner. To plot a particle size distribution curve, which is obtained by the particle size distribution analyzer, of the large-diameter particles, it is preferable to conduct fitting on the premise that the number of peak within a range of an average particle size of 1 µm or larger is one.

On the other hand, when it is mathematically or logically reasonable to conduct fitting on the premise that the number of the peak is plural (for example, two to five), the particle size distribution curve may be plotted by fitting that is conducted on the premise that there will be multiple peaks. In this case, according to the number of peak, there are first large-size particles, second large-size particles, third large-size particles, and so forth having multiple average particle sizes R1, R2, R3, and so forth. These large-size particles are collectively called a large-size particle group. The average particle size, which is obtained by weighting the average particle size of the large-size particles that belong to the large-size particle group according to the proportion of the large-size particles present and determining the average, corresponds to the "average particle size R of the large-size particles" of the present invention.

A half width (full half width) of the peak in the particle size distribution curve of the large-size particles is preferably from 0.2 µm to 500 µm, more preferably from 0.2 µm to 250 µm, and even more preferably from 0.2 µm to 100 µm. It is preferable to use large-size particles having a peak with a narrow half width, since this makes it easy to estimate the speed at the time of spraying and the collision energy relating to the speed and to control the spraying conditions.

It is preferable that the half width of the peak in the particle size distribution curve of the large-size particles be determined based on a distribution curve plotted by conducting fitting on the premise that the number of the peak within a range of an average particle size of 1 µm or larger is one. On the other hand, when it is mathematically and logically reasonable to conduct fitting on the premise that there are multiple peaks (for example, two to five peaks), the half width of each peak may be determined on the assumption that the number of the peak is plural. Even in this case, it is preferable for the half width of each peak to fall within the above range.

A relative ratio (r/R) between the average particle size r and the average particle size R of the small-size particles and the large-size particles constituting the mixed particles satisfies the relationship of $(1/1{,}000) \leq (r/R) \leq (1/5)$. The relative ratio more preferably satisfies the relationship of $(1/750) \leq (r/R) \leq (1/10)$, even more preferably satisfies the relationship of $(1/500) \leq (r/R) \leq (1/20)$, and still more preferably satisfies the relationship of $(1/250) \leq (r/R) \leq (1/30)$.

If the relative ratio satisfies the above relationship, the difference between the average particle size r of the small-size particles and the average particle size R of the large-size particles becomes more obvious. When the small-size particles and the large-size particles are formed of the same inorganic substance (for example, titanium oxide), the difference in the average particle size becomes more obvious, and this means that the weight of each of the small-size particles is obviously different from the weight of each of the large-size particles.

In the present invention, if the difference in the weight is obvious, this is preferable since the spraying conditions can be more easily set in consideration of the difference in the weight. For example, if the difference in the weight is comparatively big, when the mixed particles are sprayed on the base material to form a film, the collision energy applied to the small-size particles by the large-size particles can be greatly increased compared to the collision energy between the small-size particles. That is, in the film formation process, the sprayed large-size particles collide with the small-size particles having reached the base material or reached the top of the other adjacent particles, whereby the small-size particles having undergone collision are pressed or rubbed against the base material or other adjacent particles. As a result, the small-size particles can be more reliably bonded to the base material or to other adjacent particles as described above.

However, if the difference in the weight is extremely large, the small-size particles having undergone collision are shattered, and this makes it difficult to form a porous film in some cases. Moreover, if the difference in the weight is extremely small, the energy, which is generated by the collision between the large-size particles and the small-size particles for causing the small-size particles to be bonded to the base material or to other adjacent particles, works in a relatively small extent. In this case, the mechanism, in which the sprayed small-size particles collide with and are bonded to the base material or other adjacent particles by the kinetic energy that the sprayed small-size particles originally have, operates dominantly.

If the relative ratio (r/R) satisfies the above relationship, the difference in the weight can fall within an appropriate range, and a porous film having a better strength and electron conductivity can be formed on the base material.

In the mixed particles, the mixing ratio of small-size particles:large-size particles is preferably 0.1 parts by weight:99.9 parts by weight to 99.9 parts by weight to 0.1 parts by weight, more preferably 0.5 parts by weight:99.5 parts by weight to 50 parts by weight:50 parts by weight, and even more preferably 1 part by weight:99 parts by weight to 20 parts by weight:80 parts by weight.

If the mixing ratio is within the above range, it is possible to cause the large-size particles to more reliably collide with the small-size particles on the base material. Consequently, the strength and electron conductivity of the porous film formed on the based material is further improved.

The film forming method of the present invention is a method for forming a porous film formed of fine particles bonded to one another on a base material, by means of spraying at least two kinds of fine particles, which are small-size particles and large-size particles of an inorganic substance having different average particle sizes, to the base material. Examples of methods of spraying the small-size particles and the large-size particles on the base material include a method of spraying mixed particles consisting of the small-size particles and the large-size particles.

The fine particles include small-size particles, the crushed small-size particles, large-size particles, and the crushed large-size particles.

According to the film forming method of the present invention, if the relative ratio satisfies the relationship of ($\frac{1}{1,000}$)≤(r/R)≤($\frac{1}{5}$), the proportion of the small-size particles and/or the crushed small-size particles in the fine particles constituting the porous film can be controlled to be 50% by volume or higher. If the relative ratio is set within a preferable range, or if the mixing ratio of the mixed particles is adjusted within a preferable range, the above proportion can be further increased. In other words, the content of the large-size particles and/or the crushed large-size particles in the porous film to be formed on the base material can be controlled to be 50% by volume or less, preferably to be 40% by volume or less, and even more preferably to be 30% by volume or less. It is considered that this is because a portion of the large-size particles having been sprayed on the base material at the time of film formation are used only for striking the small-size particles, and accordingly, the large-size particles bounce off to the outside after collision without forming the porous film.

The smaller the content of the large-size particles or the crushed large-size particles in the porous film is, the more the particle size of the fine particles constituting the porous film becomes uniform, and this is preferable since the strength and electron conductivity of the porous film is improved.

The content of the large-size particles or crushed large-size particles in the porous film may be determined by observing the cross-section of the porous film with an electron microscope. The fine particles confirmed to be larger than the small-size particles not yet being sprayed may be regarded as the large-size particles or the crushed large-size particles to determine the above content. The content is determined on the percentage basis of the area of the large-size particles or the crushed large-size particles in a unit area of the cross-section. The larger the unit volume is, the more the content in the porous film is accurately calculated. For example, the unit area is preferably $100 \, \mu m^2$.

When the small-size particles and the large-size particles are sprayed on the base material, in view of the photoelectric conversion efficiency, the higher the proportion of the large-size particles is, the bigger the energy of striking the particles becomes. As a result, the particles are more firmly bonded to one another, and this leads to the increase in the photoelectric conversion efficiency. Accordingly, in the mixed particles not yet being sprayed, it is preferable for the proportion of the large-size particles to be larger than the proportion of the small-size particles.

Further, in view of the film formation efficiency of the porous film, the small-size particles contribute to the formation of the porous film to a larger extent. Therefore, it is preferable for the proportion of the small-size particles to be larger than the proportion of the large-size particles.

According to the film forming method of the present invention, after bonding, the ratio between the small-size particles and the large-size particles increases in many cases, compared to the ratio between the small-size particles and the large-size particles in the fine particles to be sprayed on the base material. That is, this means that the ratio of the small-size particles/large-size particles after bonding is higher than the ratio of the small-size particles/large-size particles used (before bonding) for being sprayed on the base material. As described above, it is considered that this is because a portion of the large-size particles having been sprayed on the base material at the time of forming a thin film are used only for striking the small-size particles, and accordingly, the large-size particles bounce off to the outside after collision without forming the porous film.

The base material is not particularly limited, and examples thereof include transparent base materials used for photoelectrodes of dye-sensitized solar cells.

Examples of the transparent base materials include substrates made of glass or plastic, resin films, and the like.

Examples of the glass as the material of the base material include general glass such as soda lime glass, borosilicate glass, quartz glass, borosilicate glass, vycor glass, alkali-free glass, blue-board glass, and white-board glass.

Moreover, according to the film forming method of the present invention, it is possible to form the film at room temperature without performing a baking step at a high temperature. Accordingly, base materials having a glass transition temperature (Tg) of lower than 200° C., for example, substrates and films made of resin, can be used. Consequently, more diverse base materials can be used compared to the conventional case, and various dye-sensitized solar cells can be produced according to the purpose and use.

Examples of the plastic as a material of the base material include a polyacrylic resin, a polycarbonate resin, a polyester resin, a polyimide resin, a polystyrene resin, a polyvinyl chloride resin, a polyamide resin, and the like. Among these, a polyester resin, particularly, polyethylene terephthalate (PET) is mass-produced and used as a transparent heat-resistant film. In view of producing thin, light, and flexible dye-sensitized solar cells, it is preferable to use a PET film as the base material.

It is preferable for the surface of the base material to be coated with a metal oxide that is used for a transparent conductive substrate of known dye-sensitized solar cells. For example, indium oxide/tin oxide (ITO), fluorine-doped tin oxide (FTO), zinc oxide, tin oxide, antimony-doped tin oxide (ATO), indium oxide/zinc oxide (IZO), gallium oxide/zinc oxide (GZO), and the like may be formed in advance on the surface of the base material. When a layer made of these metal oxides is formed on the surface of the base material, it is preferable for the porous film to be formed by being laminated on the metal oxide layer. The layer made of the metal oxide may be a single layer or multiple layers.

Examples of methods of spraying the mixed particles as fine particles on the base material include an aerosol deposition method (AD method) using carrier gas, an electrostatic fine particle coating method accelerating the mixed particles by using an electrostatic force, a cold spraying method, and the like. Among these methods, the AD method is preferable since this makes it easy to control the speed of spraying and to adjust the strength and film thickness of the porous film to be formed.

The AD method is a method of accelerating fine particles close to subsonic speed to supersonic speed by using carrier gas such as helium to spray the fine particles on a base material.

Due to the collision caused in the above manner, a new surface is formed on the surface of the base material and on the surface of the fine particles. The base material is bonded to the fine particles mainly through the newly formed surface.

Due to the collision between the fine particles, a surface is newly formed on the surface of each of the fine particles, and the fine particles are bonded to one another mainly through the newly formed surface. At this time, if the speed of spraying is appropriately controlled, the degree of crushing of the small-size particles and the large-size particles can be adjusted. Usually, the greater the speed of spraying, the higher the degree of crushing of the small-size particles and the large-size particles.

When the fine particles collide with one another, the temperature does not easily increase to such a degree that melts the fine particles. Accordingly, in the interface where the fine particles are boned to one another, there is substantially no vitreous grain boundary layer. If the fine particles are continuously sprayed, a large number of the fine particles are bonded to the surface of the base material, whereby a porous film is gradually formed. Having a strength and electron conductivity sufficient for a photoelectrode of a dye-sensitized solar cell, the formed porous film does not need to be subjected to baking densification by means of baking.

As the method of controlling the speed of spraying, for example, the diameter of an opening (the diameter of an opening portion or the length of one side of the opening portion) of the spraying nozzle can be adjusted. As the diameter of the opening is further enlarged, the speed of spraying can be decreased, and as the diameter of the opening is narrowed, the speed of spraying can be increased. For example, if the fine particles (small-size particles or large-size particles) carried by gas are sprayed through a nozzle opening having a diameter of the opening of 1 mm or less, the particles can be easily accelerated to about hundreds of m/s.

When the porous film is formed by spraying the large-size particles and the small-size particles on a base material, the strength or thickness of the porous film to be formed can be adjusted according to the size and proportion of the particles to be used, the speed at which the particles are sprayed on the base material, and the like. However, in the film forming method according to the present invention, it is preferable to satisfy the following conditions (i) and (ii).

(i) The large-size particles should not be crushed or practically are not crushed by the impact caused when the particles are sprayed on the base material.

(ii) The small-size particles should not be deformed or practically are not deformed even being struck by the large-size particles.

If the large-size particles are crushed by impact, the crushed large-size particles get into the film, whereby the strength and electric conductivity of the formed porous film deteriorate in some cases. Accordingly, it is preferable to satisfy the condition (i). Moreover, if the small-size particles are deformed by being struck by the large-size particles, the formed thin film becomes a dense film instead of a porous film in some cases. Accordingly, it is preferable to satisfy the condition (ii).

In the present invention, the words "fine particles are bonded to one another" refer to a state where surfaces have been newly formed on the surfaces of fine particles adjacent to each other and have come into close contact with each other. The state of close contact can also be described as a state where the surfaces are fused with and stuck to one another (state of cohesion).

In many cases, in the surfaces of the particles bonded to one another, there is substantially no vitreous grain boundary layer that is formed when the surface of the particles are melt.

Generally, through electron microscopic observation, it is confirmed that the "bonded state" is clearly different from the "state where the particles merely come into contact with one another". When an SEM image of a magnification (for example, magnifications of 50,000× to 200,000×) of such a degree that makes it possible to observe all the fine particles (a degree that makes all the fine particles within the observation field) is captured, a state where pores are not formed in the boundary between the fine particles in the bonded state and the particles come into close contact with one another is observed. An area in which the perimeters of the fine particles coming into close contact with each other are continuously connected to each other can be regarded as a form of the bonded state.

Figure 2:
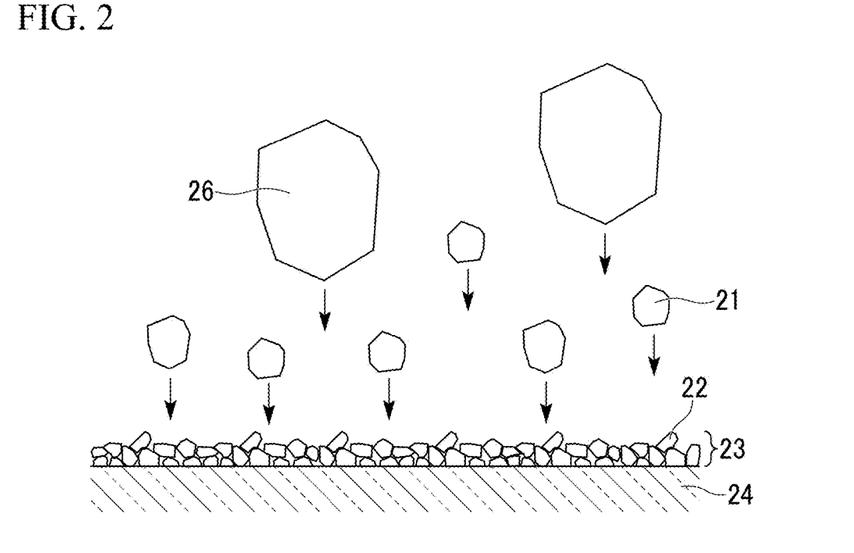
FIG. 2 is a cross-sectional view schematically showing an example of a film forming process.

FIG. 2 is a schematic cross-sectional view showing an example of a process of forming a film by the film forming method according to the present invention. The drawing shows a state where mixed particles consisting of small-size particles 21 and large-size particles 26 are sprayed on the surface of a base material 24, and fine particles 22 are bonded to one another to form a porous film 23. Here, in FIG. 2, the relative size of the small-size particles 21, the large-size particles 26, and the fine particles 22 is merely an example, and the present invention is not limited thereto. The porous film 23 is described as if it is constituted with the fine particles 22 smaller than the small-size particles 21. However, the fine particles 22 are not necessarily smaller than the small-size particles 21, and there may be a case where the small-size particles 22 and/or the large-size particles 26 form the porous film 23 while maintaining the original form thereof without being crushed.

Figure 3:
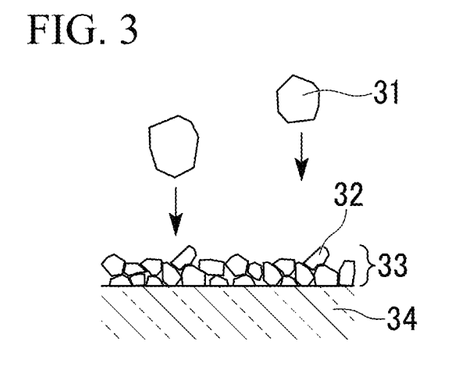
FIG. 3 is a cross-sectional view schematically showing an example of a film forming process.
Figure 4:
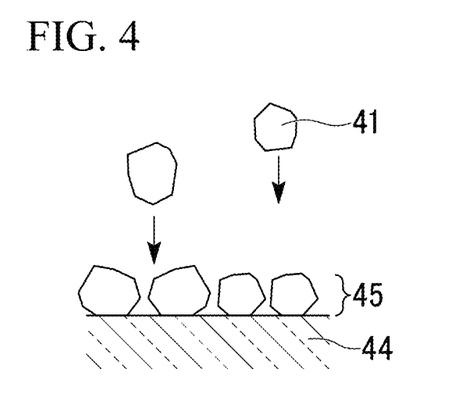
FIG. 4 is a cross-sectional view schematically showing an example of a film forming process.

FIG. 3 is a schematic cross-sectional view showing an example of a process of forming a film by spraying only small-size particles 31 instead of spraying mixed particles as fine particles. The small-size particles 31 are sprayed on the surface of a base material 34, and the small-size particles 31 and fine particles 32 formed of the crushed small-size particles 31 form a thin film 33. The thin film 33 is a porous film or a dense thin film. In order to form a film by spraying only the small-size particles 31, it is necessary to apply a large amount of kinetic energy to crush the small-size particles 31 by means of increasing the speed of spraying. However, it is generally not easy to adjust the degree of crushing of the small-size particles 31. Particularly, when the small-size particles 31 having irregular average particle sizes are used, it is difficult to control the degree of crushing caused by spraying. Accordingly, even if the thin film 33 is in the form of a porous film, it is not easy to control the porosity thereof. When the small-size particles 31 are crushed excessively, the thin film 33 becomes a dense film, and the porosity thereof becomes extremely low. Further, as shown in FIG. 4, if small-size particles 41 are weakly sprayed such that these particles are not crushed, the small-size particles 41 are not bonded to a base material 44 and merely deposited in many cases. The small-size particles 41 deposited onto the base material 44 becomes a so-called powder compact 45. The powder compact 45 is a brittle deposit that is easily peeled from the base material 44.

In the present invention, the speed of the mixed particles accelerated by the carrier gas is preferably 10 m/s to 650 m/s, more preferably 10 m/s to 250 m/s, and even more preferably 10 m/s to 150 m/s.

If the speed is less than or equal to the upper limit of the above range, when mainly the small-size particles among the mixed particles to be sprayed collide with the base material or with the fine particles that have already been bonded to one another, the small-size particles are not excessively crushed, and a porous film can be easily formed.

If the speed is equal to or higher than the lower limit of the above range, mainly the small-size particles among the mixed particles to be sprayed are reliably bonded to the base material or to the fine particles that have already been bonded to one another, and this makes it easier to form a porous film having a sufficient strength and electron conductivity.

The speed of the mixed particles accelerated by the carrier gas may be appropriately controlled within the above range, according to the type of the base material, the average particle size r of the small-size particles, the particle size R of the large-size particles, the type of the inorganic substance forming the small-size particles and the large-size particles, and the like.

The film forming method of the present invention is a method that can form a film in a room temperature environment. Herein, the room temperature refers to a temperature sufficiently lower than a melting point of the mixed particles and is practically 200° C. or lower.

The temperature of the room temperature environment is preferably less than or equal to a melting point of the base material. When the base material is made of a resin, it is preferable for the temperature of the room temperature environment to be lower than a Vicat softening temperature.

In the film forming method of the present invention, for example, an ultrafine particle beam deposition method and an apparatus thereof disclosed in PCT International Publication No. WO01/27348A1 or a method of low-temperature formation of ultrafine particles of brittle materials and an apparatus thereof disclosed in Japanese Patent No. 3265481 may be used, within a range that does not depart from the gist of the present invention.

In the above known AD methods, it is important to impose internal strain in advance on the fine particles such that the fine particles may or may not be cracked, by means of performing pretreatment on the fine particles to be sprayed by using a ball mill or the like. If the internal strain is imposed in advance, the fine particles to be sprayed can be easily crushed or deformed when colliding with the base material or the fine particles that have already been bonded to one another, and accordingly, a dense film can be formed.

In the film forming method of the present invention, it is not necessary to impose internal strain in advance on the mixed particles to be sprayed. Having an appropriate strength, the mixed particles are not excessively crushed when being sprayed, and a porous film having enough pores formed inside thereof can be formed. As a result, a porous film having a large specific surface area can be formed.

On the other hand, if mixed particles on which internal strain has been imposed in advance are sprayed to form a film, an extremely dense thin film having a low porosity is obtained. Such a dense thin film does not easily adsorb a dye (sensitizing dye) and is inappropriate for use as a photoelectrode.

In the film forming method of the present invention, in order to prevent the mixed particles from agglomerating before being sprayed and forming secondary particles, an aerosol generator used for the above ultrafine particle beam deposition method, a classifier, and/or a disintegrator may be used.

In the film forming method of the present invention, the porosity of a porous film to be formed can be adjusted according to the speed or angle of spraying of the mixed particles. However, if the average particle size r and the average particle size R of the mixed particles are set within the preferable range described above, the porosity can be more effectively adjusted.

The method for preparing the mixed particles is not particularly limited. For example, the small-size particles and the large-size particles may be evenly mixed by a ball mill or the like before they are sprayed on a base material.

<<Body Having Film Formed Thereon>>

The body having a film formed thereon of the present invention at least includes the porous film formed by the film forming method described above and the base material described above.

The above porous film is a porous film having pores (also called holes or fine pores) that can carry the dye of a dye-sensitized solar cell.

The porosity (also called a void ratio, microporosity, or porosity rate) of the porous film is preferably 50% or higher, more preferably 50% to 85%, even more preferably 50% to 80%, and particularly preferably 50% to 65%.

If the porosity is equal to or higher than the lower limit of the above range, the pores can carry the dye in a larger amount. If the porosity is less than or equal to the upper limit of the above range, the strength of the porous film can be further increased.

In the specification and Claims of the present application, the porosity refers to "a percentage of the volume of pores per unit volume of the formed thin film". The porosity is calculated by an expression of porosity=relative specific gravity/absolute specific gravity×100(%). Moreover, the relative specific gravity is obtained by dividing a mass per unit volume of the porous film by a mass (theoretical value) of the particles of an inorganic substance per unit volume, and the absolute specific gravity refers to a specific gravity (theoretical value) of the particles of an inorganic substance. Further, the porosity can be measured by gas adsorption porosimetry or mercury intrusion porosimetry that is known as an analysis method of properties of a microstructure.

The porous film is formed on the base material described above, and the thickness of the porous film is preferably 1 µm to 200 µm, more preferably 2 µm to 100 µm, and even more preferably 5 µm to 50 µm.

If the thickness is greater than or equal to the lower limit of the above range, it is possible to further increase the probability that the dye carried by the porous film will absorb light energy, whereby the photoelectric conversion efficiency of the dye-sensitized solar cell can be further improved. If the thickness is less than or equal to the upper limit of the above range, bulky electrolytes (electrolytes in the solar cell) are more efficiently exchanged with electrolytes in the porous film by diffusion, whereby the photoelectric conversion efficiency can be further improved.

Furthermore, it is preferable for the porosity of the porous film constituting the body having a film formed thereon of the present invention to increase stepwise or continuously in the film thickness direction that is getting away from the base material.

The titanium oxide paste manufactured by Peccell Technologies, Inc. is a commercially available product that can form a porous titanium oxide layer by low-temperature baking performed for 5 minutes at 110° C. Moreover, it is known that a porous semiconductor layer can be formed by low-temperature baking described above (see Chemistry Letters, Vol. 36, No. 6 (2007) and the like).

The low-temperature baking described above is performed at a temperature milder than the conventional baking temperature such as 500° C. However, it is difficult to use substrates or films made of resins as base materials for this technique.

The method of obtaining a photoelectrode for a dye-sensitized solar cell by means of causing the above dye to be adsorbed onto the porous film constituting the body having a film formed thereon of the present invention is not particularly limited, and examples of the method include the following.

First, a dye which will be described later is dissolved in a solvent, and a tetrabutyl ammonium cation (hereinafter, called "TBA" in some cases) is added thereto to prepare a dye solution. The body having a film formed thereon is dipped into the dye solution to cause the dye and TBA to be adsorbed onto the porous film, whereby the body having a film formed thereon can be made into a photoelectrode.

The dye is not particularly limited, and sensitizing dyes generally used for dye-sensitized solar cells can be used. Examples of the dye include ruthenium dyes such as cis-di(thiocyanato)-bis(2,2'-bipyridyl-4,4'-dicarboxylic acid) ruthenium (II) (hereinafter, called "N3" in some cases), a bis-TBA salt of N3 (hereinafter, called "N719" in some cases), and a tris-tetrabutylammonium salt of tri(thocyanato)-(4,4',4"-tricarboxy-2,2':6',2"-terpyridine)ruthenium (called a "black dye"). Examples of the dye also include various organic dyes based on coumarin, polyene, cyanine, hemicyanine, thiophene, indoline, xanthene, carbazole, perylene, porphyrin, phthalocyanine, merocyanine, catechol, squarylium, and the like. Moreover, a donor-acceptor complex dye and the like as a combination of these dyes may be used as the dye.

As the solvent used for preparing the dye solution, one or more kinds among various solvents such as alcohol, nitrile, ether, ester, ketone, hydrocarbon, halogenated hydrocarbon can be used by being mixed with each other.

Examples of the alcohol include methyl alcohol, ethyl alcohol, propyl alcohol, isopropyl alcohol, butyl alcohol, isobutyl alcohol, t-butyl alcohol, ethylene glycol, and the like.

Examples of the nitrile include acetonitrile, propionitrile, and the like.

Examples of the ether include dimethyl ether, diethyl ether, ethyl methyl ether, tetrahydrofuran, and the like.

Examples of the ester include ethyl acetate, propyl acetate, butyl acetate, and the like.

Examples of the ketone include acetone, methyl ethyl ketone, diethyl ketone, methyl isobutyl ketone, and the like.

Examples of the hydrocarbon include pentane, hexane, heptane, octane, cyclohexane, toluene, xylene, and the like.

Examples of the halogenated hydrocarbon include methylene chloride, chloroform, and the like.

When N3 or N719 is used as the dye, as the solvent for preparing the dye solution, for example, it is preferable to use a mixed solvent consisting of t-butyl alcohol (t-BuOH) and acetonitrile (MeCN).

As the TBA cation added to the dye solution, it is preferable to add TBA hydroxide or a TBA salt, which is in a state of being dissolved or dispersed in an appropriate solvent, to the dye solution.

Examples of the TBA salt include TBA bromide (TBAB), TBA iodide (TBAI), and the like.

The amount of the TBA cation added to the dye solution is preferably in a range of 0.1 equivalents to 3.0 equivalents, more preferably in a range of 0.3 equivalents to 2.5 equivalents, and even more preferably in a range of 0.5 equivalents to 1.5 equivalents, per 1 mol of the dye contained in the dye solution. If the amount of the TBA cation added is less than 0.1 equivalents, the effect obtained by adding the TBA cation becomes insufficient, and the photoelectric conversion efficiency becomes the same as in the case of not adding the TBA cation. If the amount of the TBA cation added exceeds 3.0 equivalents, this is not preferable since the effect obtained by adding the TBA cation does not increase any further.

The concentration of the dye in the dye solution is not particularly limited. However, in general, the concentration is preferably in a range of 0.05 mM to 1.0 mM, and more preferably in a range of 0.1 mM to 0.5 mM.

The method of dipping the body having a film formed thereon into the dye solution is not particularly limited. However, examples thereof include a method in which the body having a film formed thereon is dipped into the dye solution placed in a container, kept as is for a certain time at a certain temperature, and then pulled up. The examples also include a method in which the supply, dipping, and pulling up of the body having a film formed thereon is continuously performed while the body is being transferred to the dye solution.

The temperature of the dye solution at the time of dipping is not particularly limited and is preferably 10° C. to 90° C. The dipping time is preferably 30 minutes to 50 hours. The dipping temperature may be combined with the dipping time, according to the combination of the type of the dye to be used and the inorganic substance constituting the porous film.

After dipping, the body having a film formed thereon is pulled up from the dye solution. The surplus dye is then optionally washed with alcohol, followed by drying.

By the above operation, a photoelectrode for a dye-sensitized solar cell that is formed by causing the dye and TBA to be adsorbed onto the porous film constituting the body having a film formed thereof according to the present invention is obtained.

The dye-sensitized solar cell of the present invention includes the body having a film formed thereon or a photoelectrode formed of the body having a film formed thereon. As members other than the photoelectrode, a counter electrode, a separator, and electrolytes (electrolytic solution), and the like that are used for known dye-sensitized solar cells can be used.

EXAMPLES

Hereinafter, the present invention will be described in more detail based on examples, but the present invention is not limited to these examples.

Examples 1 to 3 and Comparative Examples 1 and 2

Small-size particles (average particle size: 30 nm) were mixed with large-size particles (average particle size: 2.31 μm) to prepare fine particles for spraying. The fine particles for spraying were sprayed at a speed of 150 m/s, thereby forming a porous film (thickness of 10 μm) formed of titanium oxide by the AD method, on a glass substrate on which a transparent conductive film (FTO) had been formed.

The mixing ratio (weight ratio) between the small-size particles and the large-size particles in each of the examples and comparative examples is shown in Table 1.

TABLE 1

|  | Content of small-size particles (%) | Content of large-size particles (%) |
| --- | --- | --- |
| Example 1 | 10 | 90 |
| Example 2 | 50 | 50 |
| Example 3 | 80 | 20 |
| Comparative example 1 | 0 | 100 |
| Comparative example 2 | 100 | 0 |

Moreover, the properties of the formed film are shown in Table 2.

TABLE 2

|  | Form of the produced film | Film thickness (μm) | Porosity (%) | Generating efficiency (%) |
| --- | --- | --- | --- | --- |
| Example 1 | Porous film | 10 | 55 | 7.06 |
| Example 2 | Porous film | 11 | 61 | 3.48 |
| Example 3 | Porous film | 16 | 53 | 2.01 |
| Comparative example 1 | Failure of formation of film | — | — | — |
| Comparative example 2 | Powder compact | 38 | — | 1.92 |

As shown in the result of Comparative example 1, when only the large-size particles (average particle size: 2.31 μm) were used, a film was not formed.

As shown in the result of Comparative example 2, when only the small-size particles (average particle size: 30 nm) are used, since these particles are not struck by the large-size particles, a powder compact was formed. Moreover, the adhesiveness between the particles is poor, and excellent electron conductivity was not obtained. Accordingly, the generating efficiency was low.

Furthermore, the results showed that the higher the proportion of the large-size particles mixed in, the better the generating efficiency. From this result, it is understood that if the large-size particles are mixed in a large amount, collision between the small-size particles and the large-size particles is caused more reliably, and an excellent porous film is obtained.

In Example 2 in which a mixing ratio of small-size particles:large-size particles=10:90, the generating efficiency was 7.06%.

In Examples 1 to 3, excellent porous films were obtained. From this result, it is understood that if the small-size particles are mixed with the large-size particles, a porous film in which the small-size particles are bonded to one another by being struck by the large-size particles is obtained.

Moreover, from all of the porous films of Examples 1 to 3, an excellent generating efficiency was obtained.

[Production of Porous Film]

As the large-size particles of Table 1, rutile-type titanium oxide particles (a rutilated rate of 95%, an average particle size of 2.31 μm, a purity of 99.9%, manufactured by Mitsuwa Chemicals Co., Ltd.) were used.

As the small-size particles of Table 1, anatase-type titanium oxide particles (model number=P25, a rutilated rate of 30%, an average particle size of 30 nm, manufactured by Nippon Aerosil Co., Ltd.) were used.

The AD method used herein was performed under the following conditions.

Figure 1:
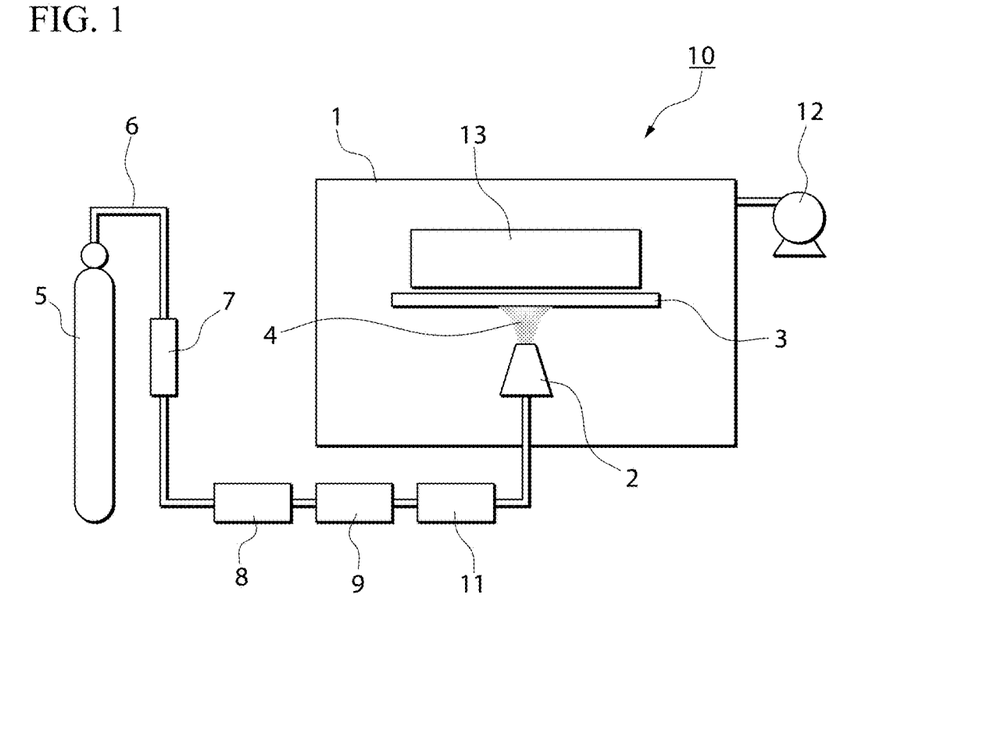
FIG. 1 is a schematic view showing a film formation apparatus usable in the present invention.

A film was formed using a film formation apparatus 10 shown in FIG. 1. In a film formation chamber 1, mixed particles 4 were sprayed on a glass substrate 3 from a nozzle 2 having a rectangular opening portion of 5 mm×0.5 mm at a spraying speed of 150 m/s.

Helium as carrier gas was supplied to a transport pipe 6 from a cylinder 5, and the flow rate thereof was controlled by a mass flow controller 7. The mixed particles for spraying were filled in an aerosol generator 8, dispersed in the carrier gas, transported to a disintegrator 9 and a classifier 11, and sprayed on the substrate 3 from the nozzle 2. The film formation chamber 1 was connected to a pump 12, and negative pressure was created in the film formation chamber.

In order to prevent the formation of secondary particles (agglomerated particles), fine particles obtained by removing water in advance from the mixed particles by means of vacuum drying were used. During the spraying performed for about 10 minutes, a stage 13 was moved horizontally to form a porous film having a uniform thickness on the glass substrate 3.

[Production of Simple Cell of Dye-Sensitized Solar Cell]

Thereafter, the glass substrates on which the film of Examples 1 to 3 and Comparative example 2 had been formed were dipped into an alcohol solution of a dye (N719, manufactured by Solaronix) adjusted to have a concentration of 0.3 mM, for 24 hours at room temperature.

Subsequently, the photoelectrode consisting of the porous film carrying the dye and the glass substrate was gently washed with alcohol, then spacers of silicon rubber having a thickness of 30 μm were disposed around the thin film, and an electrolytic solution (Iodolyte 50, manufactured by Solaronix) was poured into the film. For exclusion of air, the resultant was then covered with a counter electrode made of glass coated with platinum, and the photoelectrode and the counter electrode were compressed by being clipped with a double clip, thereby obtaining a simple cell of a dye-sensitized solar cell. An effective area thereof was 4 mm$^2$.

[Evaluation of Photoelectric Conversion Efficiency (Generating Efficiency)]

A solar simulator (AM 1.5, 100 mW/cm$^2$) including an I-V characteristic analyzer was used to evaluate a photoelectric conversion efficiency (generating efficiency) as an index of the performance of the prepared simple cell.

As result, the photoelectric conversion efficiency of Examples 1 to 3 and Comparative example 2 was confirmed to be 7.06%, 3.48%, 2.01%, and 1.92% respectively. This result clearly shows that the body having a film formed thereon that includes the porous film of Examples 1 to 3 is excellent as a photoelectrode.

The reason why the photoelectric conversion efficiency of the dye-sensitized solar cell according to Example 1 is excellent is that the porous film of the body having a film formed thereon that constitutes the solar cell is excellent in the strength, electron conductivity, dye adsorptivity, and diffusivity of the electrolytic solution.

[Measurement of Porosity]

The porosity of the porous film of the body having a film formed thereon prepared in Examples 1 to 3 was measured by a nitrogen adsorption method. As a result, the porosity was confirmed to be 55%, 61%, and 53% respectively. The obtained porosity of the film is shown in Table 1. The porosity of the porous film of the body having a film formed thereon obtained in Comparative examples 1 and 2 was measured by the same method as above. However, it was impossible to measure the porosity in both of the comparative examples, since a film was not formed in Comparative example 1, and a powder compact was formed in Comparative example 2.

[Measurement of Ratio Between Particles]

Figure 5:
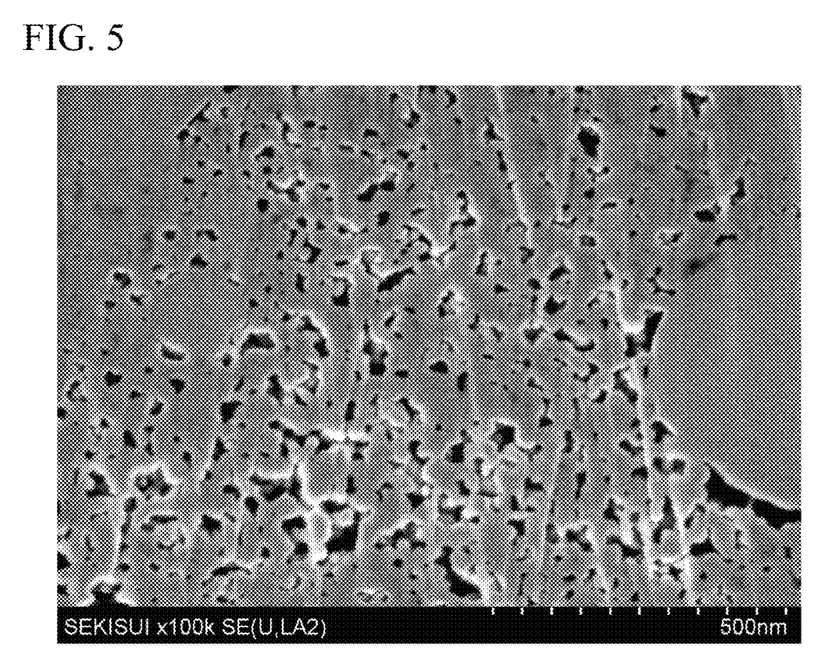
FIG. 5 is an example of an electron micrograph (SEM image) of the body having a film formed thereon according to the present invention.
Figure 6:
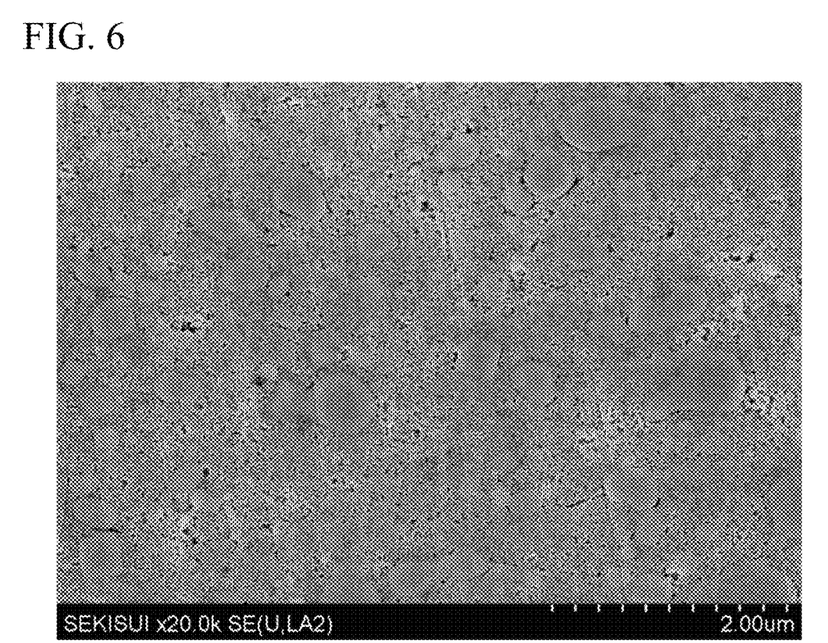
FIG. 6 is an example of an electron micrograph (SEM image) of the body having a film formed thereon according to the present invention.
Figure 7:
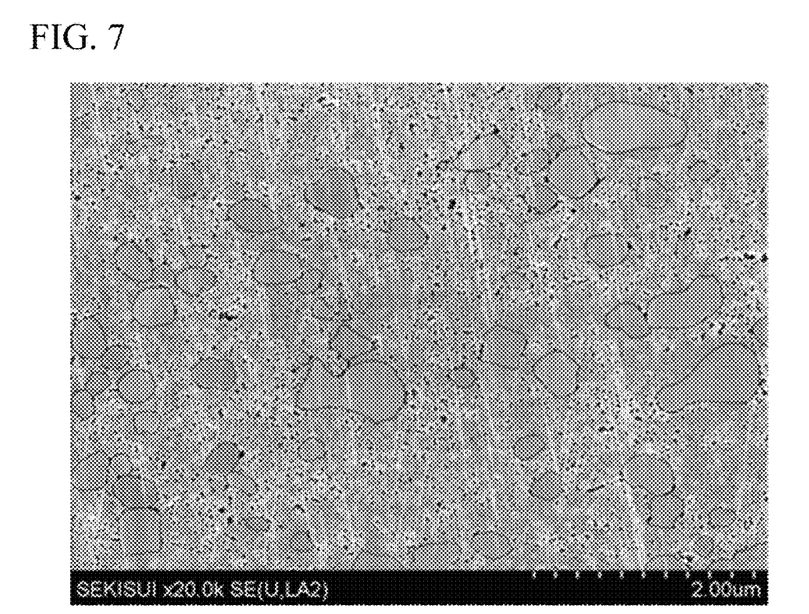
FIG. 7 is an example of an electron micrograph (SEM image) of the body having a film formed thereon according to the present invention.
Figure 8:
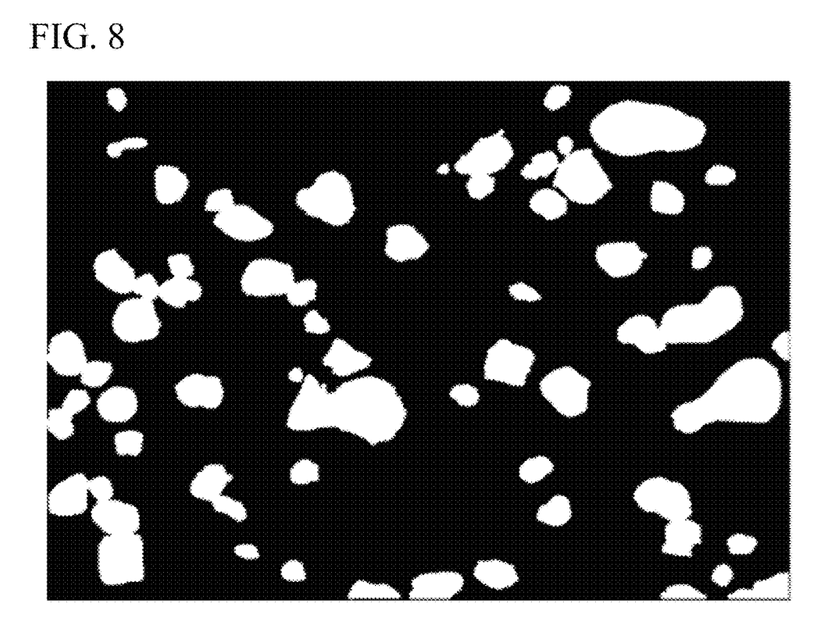
FIG. 8 is an example of an electron micrograph (SEM image) of the body having a film formed thereon according to the present invention.

The cross-section of the porous film of the body having a film formed thereon of Example 1 that was prepared using mixed particles in which a ratio of small-size particles:large-size particles=10:90 was observed with an electron microscope, and an SEM image thereof was captured (see FIG. 5). As a result, it was confirmed that the particles constituting the porous film had been bonded to one another. FIG. 5 is an image obtained by capturing an image of a surface, which was formed by smoothly shaving off a fracture surface of the porous film by means of ion milling, at magnifications of about 100,000×. The image shows that the newly formed surfaces of the fine particles have adhered to one another. FIG. 6 shows an SEM image obtained by capturing the cross-section thereof at magnifications of about 20,000×. FIGS. 7 and 8 show results obtained by analyzing the SEM image. From FIGS. 7 and 8, it is understood that the porous film is formed of fine particles mainly consisting of the small-size particles and the crushed small-size particles, the proportion of the large-size particles contained in the porous film is estimated to be 20.7%, and the ratio between small-size particles and large-size particles in the porous film has increased compared to the ratio between the small-size particles and the large-size particles in the fine particles to be sprayed on the base material.

Example 4

Next, the average particle size of the small-size particles was changed to 200 nm (0.2 μm) from 30 nm to confirm the influence of the size of the small-size particles. In the mixed particles, a mixing ratio of small-size particles:large-size particles=10:90.

The properties of the formed film are shown in Table 3.

TABLE 3

| | Form of produced film | Film thickness (μm) | Porosity (%) | Generating efficiency (%) |
|---|---|---|---|---|
| Example 4 | Porous film | 2 | 7 | 0.2 |

When particles having an average particle size of 0.2 μm or larger were used as small-size particles, the small-size particles were formed into a film while experiencing deformation, and accordingly, a porous film having a low porosity was formed. Therefore, the film thickness was also small. Moreover, since the porous film had a low porosity, the surface area for carrying a dye also decreased, and the generating efficiency was lowered compared to a case of using small-size particles having an average particle size of less than 0.2 μm. From these results, it was understood that if fine particles consisting of small-size particles and large-size particles having different average particle sizes are sprayed on a base material, a porous film of an inorganic substance is formed on the base material, and a simple cell of a dye-sensitized solar cell produced from a body having the film formed thereon shows a generating efficiency that enables the cell to function as a battery. It was also understood that if small-size particles having an average particle size of less than 0.2 μm are used, the simple cell of a dye-sensitized solar cell obtained from the body having the film formed thereon demonstrates a higher generating efficiency.

The film forming method of Example 4 was implemented in the same manner as in Example 1, except that the average particle size of small-size particles was changed to 200 nm (0.2 μm). Moreover, the production of the simple cell of a dye-sensitized solar cell, the evaluation of the photoelectric conversion efficiency (generating efficiency), and measurement of porosity and ratio between particles were performed in the same manner as in Example 1.

Example 5

[Film Formation Using PEN Film and Production of Simple Cell]

A film was formed in the same manner as in Example 2, except that a PEN film (glass transition temperature (Tg): 126° C., coated with ITO) was used instead of a glass substrate as a base material. Further, a simple cell of a dye-sensitized solar cell prepared using a body having the film formed thereon was prepared to compare properties of solar cells.

The properties of the obtained film and the properties of the simple cell of the dye-sensitized solar cell are shown in Table 4 together with Example 2.

In Example 5, the production of the simple cell of the dye-sensitized solar cell, the evaluation of the photoelectric conversion efficiency (generating efficiency), and the measurement of porosity and ratio between particles were performed in the same manner as in Example 1.

TABLE 4

| | Form of produced film | Film thickness (μm) | Porosity (%) | Generating efficiency (%) |
|---|---|---|---|---|
| Example 2 | Porous film | 11 | 61 | 3.48 |
| Example 5 | Porous film | 9 | 66 | 3.57 |

It was found that a film can be formed on the PEN film having a Tg of 126° C., and particular damage was not found in the film.

Moreover, there was no great difference in the porosity or generating efficiency compared to the case (Example 2) of the glass substrate. From these results, it is understood that a porous film can be formed on a resin film, which cannot endure a high temperature, as it can be formed on glass.

The above results clearly show that the film forming method of the present invention does not require a baking step, and accordingly, a time taken for forming a film can be shortened. Furthermore, the results clearly show that since the film can be formed at room temperature, a porous film can be formed on a base material such as plastic or a resin film.

INDUSTRIAL APPLICABILITY

The film forming method of the present invention can be widely used for producing dye-sensitized solar cells.

REFERENCE SIGNS LIST 1 film formation chamber
2 nozzle
3 base material
4 mixed particles
5 gas cylinder
6 transport pipe
7 mass flow controller
8 aerosol generator
9 disintegrator
10 film formation apparatus
11 classifier
12 pump
13 stage
21 small-size particles
22 fine particles
23 porous film
24 base material
26 large-size particles
31 small-size particles
32 fine particles
33 thin film
34 base material
41 small-size particles
44 base material
45 powder compact

The invention claimed is:

1. A method for forming a porous film of an inorganic substance on a base material by spraying dry fine particles of an inorganic substance on the base material such that the fine particles are bonded to the base material and bonded to one another, the spraying being performed by an aerosol deposition method in which the dry fine particles are accelerated by using a carrier gas and sprayed onto the base material,
wherein:

the dry fine particles include at least two kinds of fine particles, which are small-size particles and large-size particles having different average particle sizes;

an average particle size r of the small-size particles satisfies 1 nm≤r<200 nm, and an average particle size R of the large-size particles satisfies 0.2 μm≤R≤100 μm;

a mixing ratio of the small-size particles to the large-size particles in the dry fine particles to be sprayed on the base material is 0.5:99.5 to 50:50 (parts by weight); and the speed of the dry fine particles accelerated by the carrier gas is 10 m/s to 650 m/s.

2. The film forming method according to claim 1, wherein a ratio between the small-size particles and the large-size particles (small-size particles/large-size particles) in the porous film becomes higher than a ratio between the small-size particles and the large-size particles (small-size particles/large-size particles) in the dry fine particles to be sprayed on the base material.

3. The film forming method according to claim 2, wherein a relative ratio (r/R) between the average particle size r of the small-size particles and the average particle size R of the large-size particles satisfies the relationship of $(1/1,000) \leq (r/R) \leq (1/5)$.

4. The film forming method according to claim 1, wherein a relative ratio (r/R) between the average particle size r of the small-size particles and the average particle size R of the large-size particles satisfies the relationship of $(1/1,000) \leq (r/R) \leq (1/5)$.

5. The film forming method according to claim 1, wherein a mixing ratio of the small-size particles to the large-size particles in the dry fine particles to be sprayed on the base material is 1:99 to 20:80 (parts by weight).

6. The film forming method according to claim 1, wherein treatment for spraying the dry fine particles of the inorganic substance on the base material is performed by spraying mixed particles consisting of the small-size particles and the large-size particles on the base material, and the large-size particles are caused to collide with the small-size particles having been sprayed on the base material such that the small-size particles are bonded to one another to form a film.

7. The film forming method according to claim 1, wherein the inorganic substance is an oxide semiconductor.

8. The film forming method according to claim 1, wherein the spraying is performed at room temperature.

9. The film forming method according to claim 1, wherein the base material is formed of a resin.

10. The film forming method according to claim 9, wherein a glass transition temperature (Tg) of the base material formed of a resin is lower than 200° C.

11. The film forming method according to claim 1, wherein the porous film is a porous film for a photoelectrode of a dye-sensitized solar cell.

12. A body having a film formed thereon that is obtained by the film forming method according to claim 1.

13. The body having a film formed thereon according to claim 12, wherein a content of the large-size particles in the porous film is 30% by volume or less.

14. A photoelectrode comprising the body having a film formed thereon according to claim 12.

15. A dye-sensitized solar cell comprising the body having a film formed thereon according to claim 12.

* * * * *